Feb. 21, 1956 C. W. VOGT 2,735,378
APPARATUS FOR FORMING PACKAGES
Original Filed Dec. 2, 1949 3 Sheets-Sheet 1
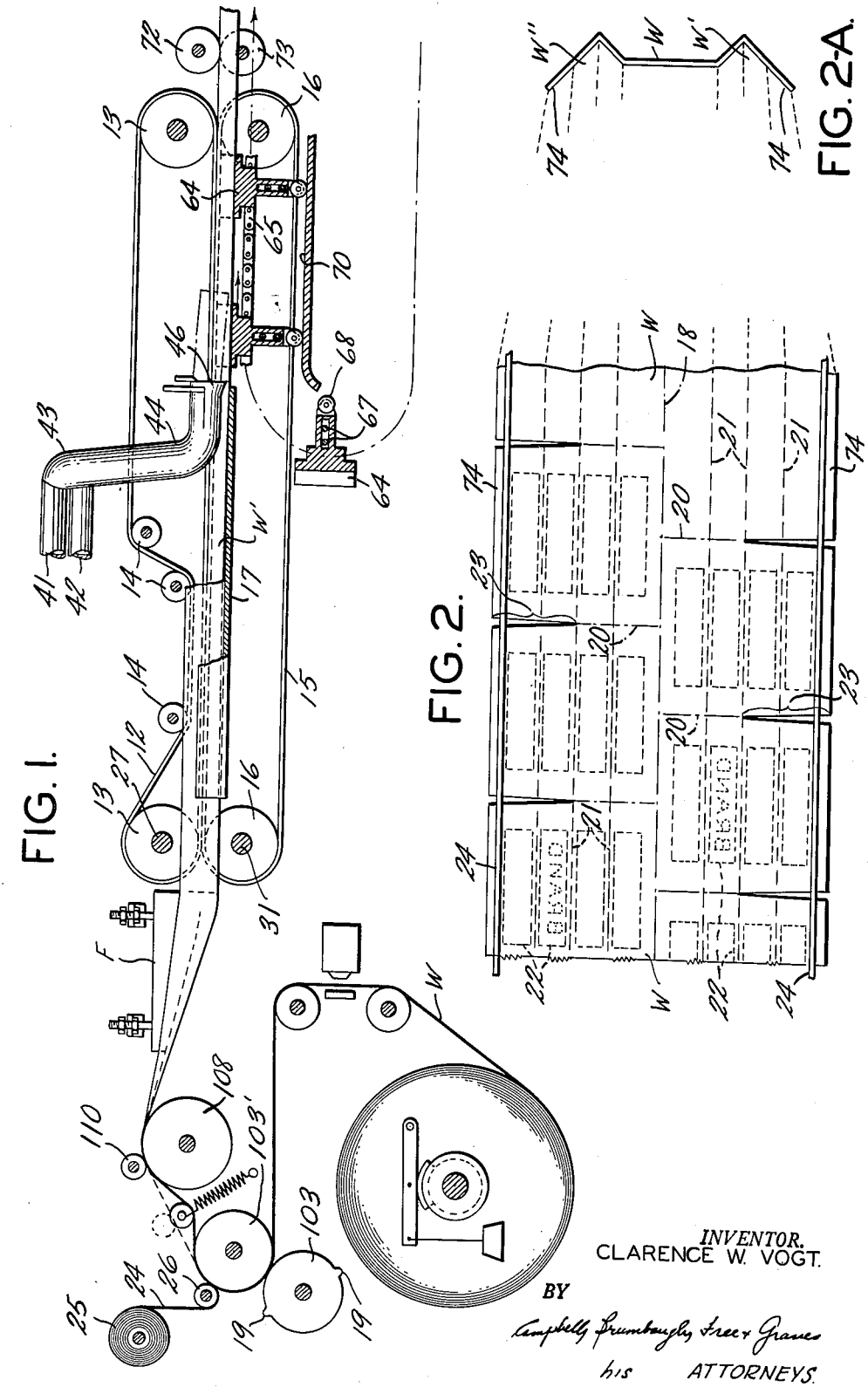
INVENTOR.
CLARENCE W. VOGT.
BY
Campbell, Brumbaugh, Free & Graves
his ATTORNEYS

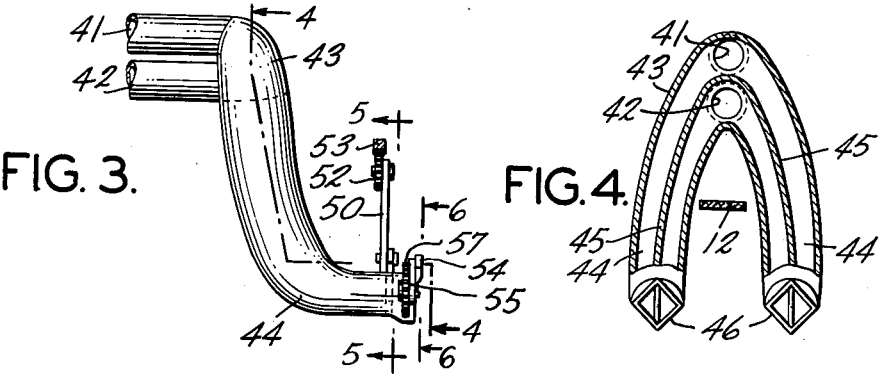
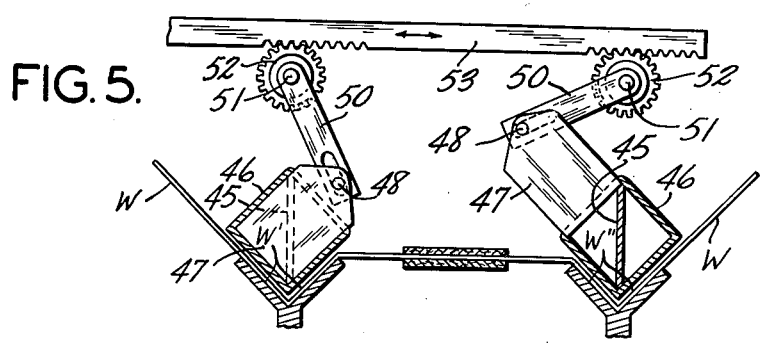
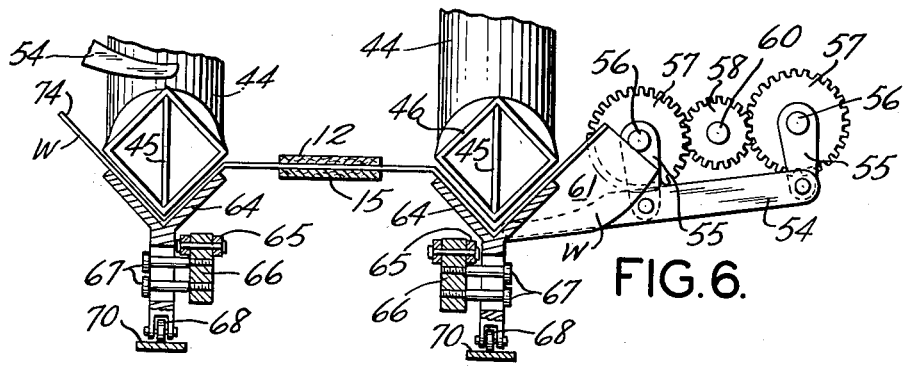
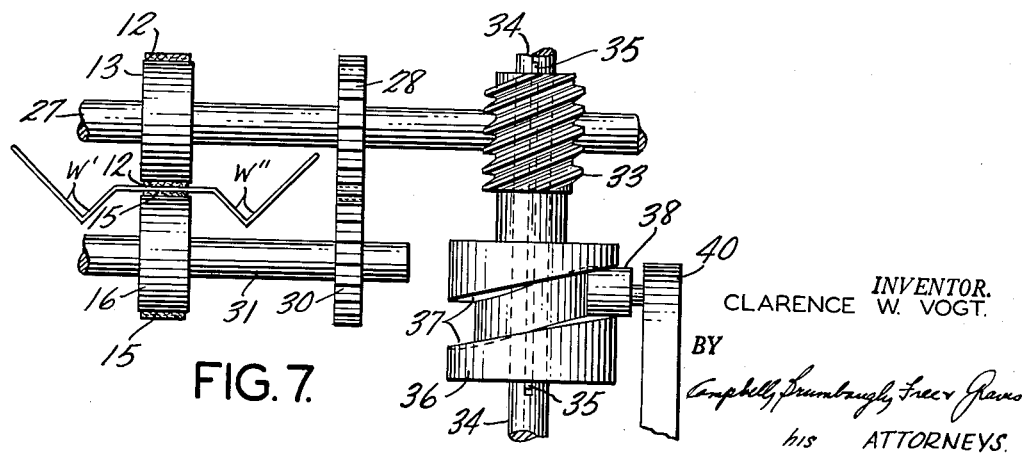

Feb. 21, 1956  C. W. VOGT  2,735,378
APPARATUS FOR FORMING PACKAGES
Original Filed Dec. 2, 1949  3 Sheets-Sheet 3
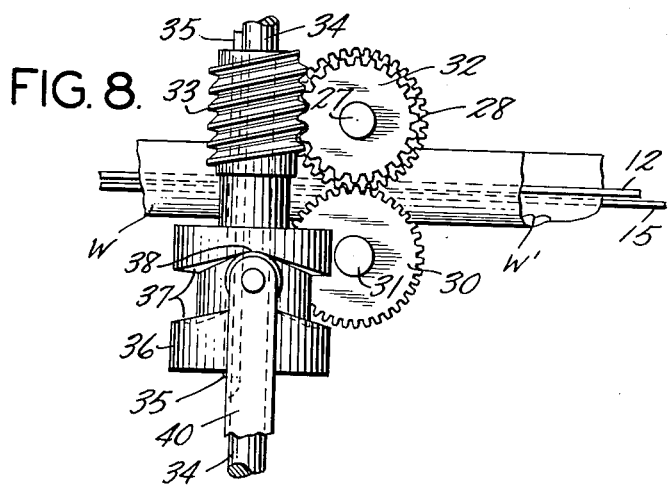
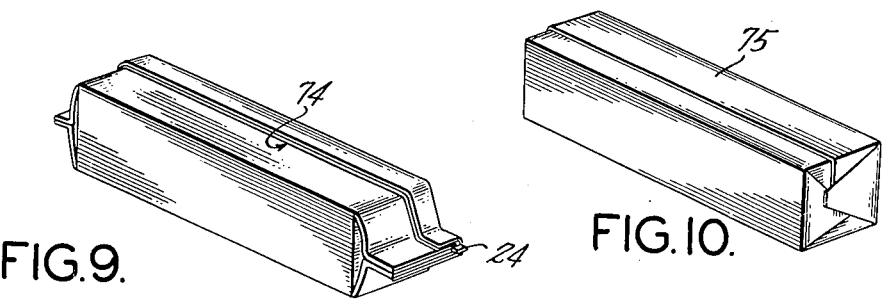
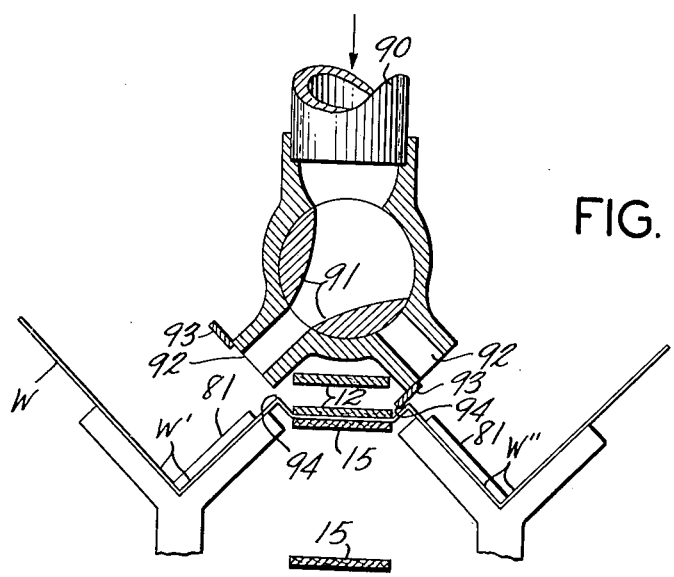
INVENTOR.
CLARENCE W. VOGT
BY
his ATTORNEYS

United States Patent Office 2,735,378
Patented Feb. 21, 1956

2,735,378
APPARATUS FOR FORMING PACKAGES
Clarence W. Vogt, Norwalk, Conn.

Original application December 2, 1949, Serial No. 130,729, now Patent No. 2,691,257, dated October 12, 1954. Divided and this application March 15, 1952, Serial No. 276,780

5 Claims. (Cl. 107—4)

The present invention relates to apparatus for forming objects to be wrapped from a continuous source or supply of plastic material, the invention contemplating the provision of a method and apparatus by means of which such objects may be formed without disturbing the continuity of flow of the material being supplied to the operation.

This application is a division of applicant's co-pending application Serial No. 130,729, filed December 2, 1949, for "Method of and Apparatus for Forming Packages," now Patent No. 2,691,257, dated October 12, 1954, and more particularly, the invention covered herein relates to the apparatus by means of which individual plastic masses may be formed and supplied to a unique form of enwrapment in order that the wrapping of these objects may be completed in accordance with suitable wrapping operations.

More particularly, the present invention embodies improved forming apparatus wherein the plastic material is extruded through a plurality of extruding orifices and in such fashion that successive objects are formed without disturbing the continuity of flow of the material supplied to the apparatus.

The invention is realized by the provision of apparatus having a plurality of extruding apertures, each being provided with closure mechanism and so operated and controlled that the total area of the opening of the plurality of apertures remains substantially constant throughout the operation.

The invention is further realized by the provision of a unique form of wrapping material susceptible of having formed objects applied thereto from a plurality of forming apertures and while the material is being moved in a predetermined course.

Other and further objects of the invention will be apparent as it is described in further detail in connection with the accompanying drawings, wherein Figure 1 is a view in side elevation, partly in section, showing in somewhat schematic form, one form of apparatus constructed in accordance with the present invention;

Figure 2 is an enlarged plan view showing one form of enwrapment material formed in accordance with the present invention and indicating the manner in which the objects to be wrapped by the material are located with respect to segments of the wrapping material;

Figure 2A is an end elevational view showing the sheet material of Figure 2 after it has been deformed into a suitable configuration for receiving objects thereon for packaging;

Figure 3 is a somewhat enlarged segmental view of the forming mechanism of the present invention;

Figure 4 is a partial view in section, taken on the broken plane indicated by the line 4—4 of Figure 3, and looking in the direction of the arrows;

Figure 5 is an enlarged view in section, taken on the plane indicated by the line 5—5 of Figure 3 and looking in the direction of the arrows;

Figure 6 is an enlarged fragmentary view in section, taken on the plane indicated by the line 6—6 of Figure 3, and looking in the direction of the arrows;

Figure 7 is an enlarged sectional view showing mechanism by means of which the enwrapment material shown in Figure 2 may be moved through the forming device of the present invention;

Figure 8 is a view in end elevation of the mechanism shown in Figure 7;

Figure 9 is a perspective view of a completed package of material formed in accordance with the present invention;

Figure 10 is a perspective view of another form of package; and

Figure 11 is a partial view in vertical section showing a modified form of the invention and embodying mechanism for depositing objects or commodities upon wrapping material.

As in applicant's co-pending application above identified of which the present application is a division, this invention will be described in connection with operations involving the packaging of a plastic commodity, such as ice cream, butter or margarine. Also, as in applicant's above identified co-pending application, it is contemplated that this plastic material shall be supplied to a forming apparatus in a continuous stream or flow and without interruption of such flow, the invention providing means by which the material so supplied may be formed successively into discrete objects and deposited upon a suitable wrapping or packaging material. The packaging material or enwrapments are shown as being in the form of a continuous web W that, in its course of travel to the forming mechanism, is fed over a suitable forming mechanism F in order that the material of the web may be deformed into two trough-shaped portions upon opposite sides of the web, as illustrated in Figure 2A. These trough-shaped portions are shown as channels W' and W'''. The forming mechanism F is similar to the forming mechanism used in folding the pages of newspapers, magazines and the like and has a profile varying from almost a straight line at its leading end to V-shaped at its trailing end thereby to impart the trough-like shape to the channels formed in the enwrapments.

During and after the shaping of the web, it may be contacted and driven by an upper friction belt 12 carried by suitably spaced pulleys or rollers 13 and guided to the desired path such as by guide rollers 14. The web may also be simultaneously contacted by a lower friction belt 15 entrained around suitable pulleys or rollers 16. The belts 12 and 15 are preferably driven intermittently in timed relation with the feed roll 108 and pressure roll 110. While the web is being advanced by the belts 12 and 15 which grip it in centrally disposed portions thereof, other portions of the web may be supported by surfaces of members 17 mounted on the frame of the apparatus to permit the web to be slid therealong.

Figure 2 is a plan view of a portion of a preferred form of web of sheet material for use in the present invention. This form of web is disclosed in my co-pending application Serial No. 120,942, filed October 12, 1949, and entitled "Sequence of Enwrapments," now abandoned. The web is defined into a pair of sequences of enwrapments by a longitudinally extending centrally disposed dash-dot line 18 defining the common border between the pair of sequences of enwrapments. Each sequence of enwrapments may also be defined into individual enwrapment sections by dash-dot lines 20 which extend along the common boundary between adjacent enwrapment sections. In addition, the web may be provided with prefabricated score lines or fold lines indicated by numeral 21, which lines may be positioned at the location of folds to be made during formation of the package and may be creased or scored to facilitate the formation of such folds. The prefabrication of the fold lines 21 defines the side panels of the completed package which will fall between these fold lines. Thus, it is possible to provide in advance printed matter over the areas of the side panels, such as for example, within the rectangles defined by dash lines 22. These rectangles will be accurately registered on each side panel of the package and the object or commodity to be packaged will occupy a predetermined position with respect to the margin of each enwrapment and with respect to the printed matter disposed on the enwrapment.

As indicated by the numeral 23, a part of the common boundary 20 between adjacent enwrapments of a sequence, may be slit at the time the enwrapments are fabricated for a purpose which will be subsequently described. The slitting of the edge portions of the web may also be accomplished by the web feed means. For example, one feed roll 103 may be provided with slitter elements 19, appropriately spaced and dimensioned with respect to a feed roll 103' to produce the slits 23 at opposite edges of the web.

To facilitate opening of the completed package, particularly if it is to be heat sealed, each sequence of enwrapments may be provided with a tear strip indicated by the numeral 24 and disposed in the region where the heat seal will be formed. It is conventional practice to adhere such tear strips in a position where they may be pulled by the consumer to tear open the sealed portion of the enwrapment and facilitate access to the contents of the package. The application and adhering of the tear strips is indicated in Figure 1. The tear strips may be supplied from a roll 25 and rolled onto the web after being provided with adhesive areas by applying the glue in the conventional manner or by heat activating a thermoplastic adhesive disposed on the surface of the tear strip. A roller 26 which may be driven or may be freely rotating is shown as positioned adjacent the periphery of the feed roll 103' to apply and press the tear strip 24 to the web W at the desired location.

As previously described, it is preferable that the web W be intermittently advanced and to accomplish this, the feed roll 108 and the belts 12 and 15 may be driven in timed relation by any suitable driving mechanism to provide the desired feeding motion. Figures 7 and 8 illustrate an excellent mechanism for obtaining appropriate intermittent advancement of the web. As shown in Figure 7, one of the rollers 13 for the belt 12 may be mounted for rotation on a shaft 27 which also carries a gear 28. This gear 28 meshes with and drives a gear 30 carried for rotation by a shaft 31 on which is mounted one of the rollers 16 for driving the lower belt 15.

The shaft 27 also carries a worm wheel 32 as may best be seen in Figure 8. Meshing with and driving the worm wheel 32 is a worm 33 which is mounted for rotation on a driving shaft 34. While the worm 33 is fixed to rotate with the shaft 34 it is also mounted so that it may move axially along the shaft 34 even during rotation. This may be done by mounting the worm on the shaft by an axially extending spline or key 35. The shaft 34 also carries for rotation a cylindrical or barrel cam 36, mounted for rotation on the shaft 34 by the spline or key 35, but capable of axial movement therealong. The worm 33 and the cam 36 are secured together so that their axial movement is identical. The periphery of the cam 36 is provided with a suitably shaped cam track 37 and disposed within the cam track is a roller follower 38 carried by a stationary support member 40. Thus, as the shaft 34 rotates, the cam 36 and worm 33 will move axially along the shaft 34 as dictated by the cam track 37 and roller follower 38. It may be seen that if the cam track 37 angles in the same direction as the lead angle of the worm 33 the cam and worm will move axially along the shaft and the worm will stop momentarily. This means that the shaft 31 and accordingly, the pulley 16 will also stop. However, since the cam track 37 has a closed course, returning to its initial position at least once during each revolution of the shaft 34, the cam track must angle in the opposite direction, causing the worm 33 to drive the worm wheel 32 and the pulley 16 at a speed exceeding their normal ratio. By varying the angularity and the arcuate extent of the angular portions of the cam track 37, almost any desired characteristics of motion of the driven shafts 27 and 31 may be obtained. For example, the shafts 27 and 31 may be caused to dwell for as much as about three-quarters of each revolution of the driving shaft 34. By forming the cam 36 with an appropriate cam track 37, the shaft 34 may be driven with any source of rotary power, moving at a constant rate, and the shafts 27 and 31 will move intermittently with the desired characteristics.

The pulleys 16 and 13 driving the belts 15 and 12, respectively, may be mounted so that the belts engage the web W therebetween with the desired pressure. Such pressure may be adjusted and be resilient so that the belts will advance the web until the web has a predetermined tension, and will thereafter slip. In this fashion the web may be supplied from a suitable roll over a suitable web tension mechanism and controlled by a suitable scanning mechanism, all of which last named mechanism is well known in the art and does not form any part of the present invention.

At a point along the path of movement of the web after the longitudinally extending receiving channels W', W" have been formed, the objects or commodities to be packaged may be deposited into each of the channels by any suitable mechanism. It is preferable that the objects be placed on the web with a corner edge of each object received in the complementary shape at the apex of the receiving channel.

A number of depositing mechanisms may be used to place a wide variety of objects on the web. Very good results may be obtained by the use of apparatus for producing measured masses of plastic material such as is shown and described in my co-pending applications Serial No. 123,575, filed October 26, 1949, entitled "Apparatus for and Method of Producing Plastic Masses," and Serial No. 126,213, filed November 8, 1949, entitled "Production of Accurately Measured Plastic Masses," now Patent No. 2,666,229, dated January 19, 1954.

For purposes of illustration, the drawings show a simple mechanism for feeding and depositing objects, such as individual servings of plastic ice cream. Such a material may be made in a continuous process apparatus and will be delivered therefrom through a conduit under pressure. Figure 3 indicates a pair of conduits 41 and 42 which may lead from a pair of continuous process units to feed two different flavors of ice cream in a partially frozen, plastic state.

These supply conduits 41 and 42 terminate in a suitable header or manifold 43 which as shown in Figure 4, leads to two branches 44. Between the junction of the conduits 41 and 42 with the header 43, and extending substantially centrally through each of the branches 44, is a partition 45 so that the two flavors from the conduits will flow in side by side divided relation through each of the branches. Each of the branches 44 terminates in a forming aperture or nozzle 46 at which point the partition 45 also terminates and the two flavors on leaving the nozzle merge to provide a composite mass or portion of the plastic material.

To control the flow of plastic material from the forming apertures and to cause alternate deposits onto each of the packaging paths, a mechanism for shutting off the flow at each of the nozzles is provided. Such a mechanism is illustrated in Figure 5. Briefly, this mechanism comprises a pair of sliding shutter members 47, mounted for movement through an opening in the wall of each of the branches 44 in the region of the nozzle 46. The partitions 45 terminate flush against the inside faces of the shutter members 47, against which partitions the shutters are preferably held under pressure. Preferably, the shutters 47 are actuated in timed relation with each other from a common mechanism so that as one is closed, the other is opened. This may be accomplished by providing each of the shutter members with a pin 48 which is received in a slot formed in an oscillating arm or rod 50. Each of the rods 50 is carried by a rocker shaft 51, which shafts also carry gears 52. The teeth of the gears 52 are in mesh with spaced portions of a driving rack 53 which is reciprocated by any suitable mechanism (not shown) in timed relation with the balance of the apparatus. The partition 45 is situated in position to form a pair of streams of plastic which have a triangular cross section and result in a rectangular or square two-flavor portion. The arrangement and movement of the partition 45 and the shutters 47 in Figure 5 is best suited for dual flavor portions of ice cream. To avoid smearing or intermixing of the flavors, the partition should be in a plane parallel to the direction of motion of the shutter members.

Since the plastic materials, such as ice cream, have a tendency to cling to surfaces with which they come in contact, deposition of the individual portions may best be obtained if each portion is sheared or wiped or severed from the end face of the forming aperture or nozzle. To accomplish this, a severing mechanism, best illustrated in Figure 6, may be utilized. Such a mechanism may comprise a suitable blade or knife 54 mounted at the end face of each of the nozzles and adapted to move through a path which will shear the plastic material extending from the nozzle and cause it to be cleanly deposited onto its enwrapment.

With the nozzles shaped as shown to produce a portion having a square or rectangular cross section, it is believed preferable to drive the blade or knife so that its tip follows a generally circular path in passing around the end of the nozzle. This may be done by mounting each of the blades on a pair of crank arms 55 carried for rotation by shafts 56. Each of the shafts 56 carries a gear 57 which meshes with and may be driven by an intermediate gear 58 mounted for rotation on a shaft 60. It may be seen that during half a revolution of the driving shaft 60, the blade will descend across the opening of the end face of the nozzle and during the other half a revolution, the blade will return to its starting position with the blade and its tip ascending exteriorly of the nozzle opening. The blades may be intermittently driven so that they make a shearing stroke and return to dwell while poised above the nozzle or may rotate continuously, preferably with an accelerated cutting stroke and a decelerated return stroke.

The shaft 60 may be driven in proper timed relation with the balance of the mechanism so that it is actuated to shear plastic extending from the nozzle shortly after the shutter member 47 is closed to stop the flow. At the time that the blade 54 is actuated, the web is preferably stationary with an enwrapment section suitably positioned beneath the nozzle to receive the portion to be deposited. The plastic may be deposited inwardly from the marginal edge of the wrapper (defined by the dot-dash line 20 in Figure 2) with the sheared end spaced from the slit edge portion 23 of the enwrapment by a distance equal to the amount of sheet material required to provide end folds for the package.

The provision of the edge slits 23 permits each of the blades 54 to pass through the path of the web W causing the end fold portions of the enwrapment in this region to be bent or flanged downwardly and outwardly against the blade. The position of the end fold portions of the enwrapment when wiping of the blade occurs is indicated by the numeral 61 at the right-hand portion of Figure 6. This flanging action is exaggerated in the drawings for clarity and is permitted by the clearance between the underside of the nozzle and the web. It may be noted that the interior surface of the blade may be caused to wipe itself clean against the end face of the nozzle, while the opposite surface of the blade will be wiped clean against the end fold portions of the enwrapment.

In the drawings, a plurality of support members 64 are shown, mounted for movement in endless paths on a chain 65. A similar series of support members may be provided for each sequence of enwrapments. If desired, the support members may be provided for individual movement in a direction perpendicularly to that of the path of the chain. This may facilitate proper positioning of the support members, at the time of deposition of the objects or commodity, or provide for movement during packaging operations.

Each of the chains 65 may carry a plurality of fixtures 66 provided with pins 67. The support members 64 carry stems which are slotted to receive the pins 67 and permit movement of the members 64 with respect to the chain. A follower 68 is carried by the stems of the support members to control the position of the members in cooperation with a cam surface 70 which may have the required configuration to locate the support members at the desired positions.

After the objects to be packaged have been deposited onto the enwrapments, it is only necessary to sever the web and complete the packaging by enclosing the enwrapments around the objects to form individual packages. It is first necessary to divide the web to separate the various sequences of enwrapments and in the form above shown, this may be readily done by slitting the web along its longitudinal center line indicated by dot-dash line 18 which forms a common boundary between the two sequences of enwrapments. Figure 1 shows a rotary slitter 72 operating in conjunction with backup or platen roller 73, and this slitter mechanism may be driven in timed relation with the travel of the web.

After severing or separating the two sequences of enwrapments, each sequence may be additionally handled to complete a package about each of the objects. The specific details of completing the packages are not considered essential to the present invention, since a number of conventional package forms may be created. Figure 9 illustrates a desirable form of package which may be made from one of the enwrapments shown in Figure 2. To obtain this type of package, opposite edge portions of the enwrapment may be folded over to close the enwrapment to tubular form about the object, with marginal edge portions indicated by the numeral 74 in Figures 2, 6, and 9, extending outwardly from the package in contiguous relation. The contiguous edge portions of the enwrapment are preferably coated with a suitable adhesive material such as a thermoplastic adhesive, and such marginal edges may be sealed together to provide what is known as a fin-type seam, extending longitudinally along the tube. The folding of the sequence of enwrapments about the series of objects deposited at proper spaced intervals along the sequence may be progressively accomplished by conventional tube forming means with the marginal edges 74 placed in engagement with each other. This tubular portion of the sequences of enwrapments may be of sufficient length to include a number of the objects to be packaged, and in this way a continuous sealer such as a pair of heated pressure rollers, may be employed to effect the longitudinal seam.

At the region between successive objects suitable end closures may be formed to permit separation into individual packages. First the longitudinally extending fin seam may be folded down onto a side panel of the object (see Figure 9), and the tube flattened in the region between adjacent objects. If desired, the opposed wall portions of the tube may be tucked just prior to flattening and sealing the tube, in a manner similar to that shown in my issued Patent No. 2,156,466, dated May 2, 1939. The flattened and sealed portion may then be cut or severed at the margins between the individual enwrapment sections so that a part of the sealed portion is disposed on each of the two adjacent packages.

Another package form is illustrated in Figure 10, and in this instance the opposite marginal edge portions 74 of the enwrapment are overlapped to provide what is known as a lap seam, indicated by the numeral 75 in Figure 10, which may or may not be heat-sealed as desired. The sequence of enwrapments may be cut into individual sections and conventional end folds made to complete the package to the form shown in Figure 10.

Figure 11 illustrates a modified form of depositing mechanism which is mounted above the shaped web of enwrapments as was described in connection with the depositing mechanism shown in Figure 5. In this form of the invention, objects are fed and deposited in a direction extending transversely of the longitudinal receiving channels W′, W″. This is considered especially desirable for assembling and packaging items such as multilayer confections and the like. A supply conduit 90 leads from a suitable source of the commodity to be packaged, and the flow may be alternately directed by an oscillating valve 91 to one or the other of a pair of forming apertures or nozzles 92, which are downwardly and outwardly directed toward the receiving channels of the web of enwrapments.

The oscillation of the valve 91 alternately opens the passage through the valve to permit substantially continuous flow of the plastic material, so that the masses may be deposited into one or the other of the packaging paths. Preferably the web of enwrapments is intermittently advanced and the deposition can be caused to occur during the hesitation or dwell of the web. To facilitate the deposition a pair of blades 93, which are similar to the blades 54 in the form of the invention shown in Figure 6, may be mounted adjacent and in the plane of the end faces of the nozzles. These blades may be driven in timed relation with each other by a mechanism similar to that shown in Figure 6. As indicated in Figure 11, the web of enwrapments may be shaped to provide portions of the web, indicated by the numeral 94, for wiping engagement with the blade, and such portions 94 may be slightly bowed so as to resiliently urge them into wiping contact with the blades. This form of the invention is considered beneficial for many plastic commodities. Where it is desirable to shear or wipe the plastic material at the time of deposit, an excellent wiping action can be obtained without providing the edge slits 23 on the web as shown in Figure 2 for the form of the invention shown in Figures 1 through 6.

An extremely satisfactory way of forming packages in accordance with the present invention is to utilize a web of packaging material with two sequences of enwrapment sections defined thereon and arranged in staggered relation with the midpoints of enwrapments of one sequence opposite to the end portions of adjacent enwrapments of the other sequences as shown in Figure 2. The web is then advanced adjacent the receiving station with an intermittent motion, each forward motion of the web being for a distance equal to one-half a wrapper length. At each pause or dwell of the web, an object may be deposited alternately in the appropriate one of the two packaging paths. When the objects being packaged comprise masses of plastic material, this arrangement facilitates the packaging operation since the plastic may be continuously flowed from a common source of supply and individual masses removed from the flow, accurately measured, and cleanly deposited. After deposition, the two sequences will contain the objects to be packaged in staggered relation (see Figure 2 of my previously identified co-pending application Serial No. 120,942).

Until the web is severed into individual sequences of enwrapments, it may be fed by a common mechanism and provides higher capacity of completed packages without a corresponding increase in the amount of apparatus. Further, the web, as described, is wider and the supply rolls therefor may be of greater diameter and permit longer operation between changes to replenish the supply. In the case of commodities furnished for packaging from a continuous fabricating operation, each shutdown of the packaging operation may seriously affect the character of the commodity and thus be more costly than merely the expense of shutting down the fabricating apparatus.

I claim:

1. Apparatus for forming packages, comprising means for feeding at least one sequence of enwrapments in a given path, means for shaping said enwrapments to provide a plurality of trough-like channels therein, means for advancing said enwrapments intermittently along said path in increments equal to about one-half the length of an enwrapment, means for continuously feeding material to be wrapped, a plurality of extruding orifices receiving the material, and discharging it into different channels in the enwrapments, closure mechanism for the orifices, and means to actuate the closure mechanism to open one of the orifices while closing another to deposit the material alternately on said enwrapments in said different channels in pieces spaced apart lengthwise of said channels.

2. Apparatus for forming packages, comprising means for feeding at least one sequence of enwrapments in a given path, means for shaping said enwrapments to provide a plurality of trough-like channels therein, means for advancing said enwrapments intermittently along said path in increments equal to about one-half the length of an enwrapment, means for continuously feeding material to be wrapped, a plurality of extruding orifices receiving the material, and discharging it into different channels in the enwrapments, closure mechanism for the orifices, and means to actuate the closure mechanism to open one of the orifices and simultaneously close other of the orifices at the same rate to deposit pieces of material of equal lengths alternately in endwise spaced relation in the different channels formed in said enwrapments, whereby the combined area of orifice opening remains constant.

3. Apparatus for forming packages, comprising means for feeding at least one sequence of enwrapments in a given path, means for shaping said enwrapments to provide a plurality of trough-like channels therein, means for continuously feeding material to be wrapped, a plurality of extruding orifices receiving the material, and discharging it into different channels in the enwrapments, and means at each orifice to cut the material extruded through the orifices, means for moving said cutting means past each orifice to engage one side of said cutting means with the orifice edge and to engage the other side of the cutting means with the enwrapment to wipe said other side clean.

4. Apparatus for forming packages, comprising means for feeding at least one sequence of enwrapments in a given path, means for shaping said enwarpments to provide a plurality of trough-like channels therein, means for continuously feeding material to be wrapped, a plurality of extruding orifices receiving the material, and discharging it into different channels in the enwrapments, closure mechanism for the orifices, means to actuate the closure mechanism to open one of the orifices and simultaneously close other of the orifices at the same rate, whereby the combined area of orifice opening remains constant, means at each orifice to cut the material extruded through the orifices, and means for moving said cutting means past each orifice to engage one side of said cutting means with the orifice edge and to engage the other side of the cutting means with the enwrapment to wipe said other said clean.

5. Apparatus for forming packages, comprising means for feeding a plurality of sequences of enwrapments in a given path by increments of movement corresponding to half the length of an enwrapment, said sequences of enwrapments being relatively staggered with the midpoints of the enwrapments of one sequence opposite the end portions of adjacent enwrapments of another sequence, means for shaping said enwrapments to provide trough-like channels in each sequence, means for continuously feeding material to be wrapped, and means for delivering the last named material alternatively to the channels in said sequences of enwrapments whereby the length of movement of the sequences being fed is not in excess of one-half the length of an enwrapment.

References Cited in the file of this patent

UNITED STATES PATENTS

| | | |
|---|---|---|
| 1,986,589 | Mapes | Jan. 1, 1935 |
| 2,109,407 | Westin | Feb. 22, 1938 |
| 2,185,469 | MacDonald | Jan. 2, 1940 |
| 2,185,470 | MacDonald | Jan. 2, 1940 |
| 2,188,837 | Gregory et al. | Jan. 30, 1940 |
| 2,303,351 | Gage et al. | Dec. 1, 1942 |
| 2,553,250 | Gross | May 15, 1951 |